United States Patent
Kerner et al.

(10) Patent No.: US 6,507,916 B1
(45) Date of Patent: Jan. 14, 2003

(54) METHOD AND CIRCUIT ARRANGEMENT FOR USING TWO PROCESSORS TO READ VALUES OF TWO INDEPENDENTLY CLOCKED COUNTERS, EXCHANGING VALUES THEREBETWEEN, COMPARING TWO VALUES TO DETERMINE ERROR WHEN THE COMPARISON EXCEED A THRESHOLD

(75) Inventors: Norbert Kerner, Traunwalchen (DE); Helmut Schlick, Weisbrunn (DE); Michael Rauth, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/408,661

(22) Filed: Sep. 29, 1999

(30) Foreign Application Priority Data

Sep. 29, 1998 (DE) .......................... 198 44 562

(51) Int. Cl.$^7$ ..................... G06F 1/04; H03K 23/00
(52) U.S. Cl. .................. 713/500; 713/502; 377/39
(58) Field of Search .......................... 713/500, 400, 713/502; 377/39

(56) References Cited

U.S. PATENT DOCUMENTS 5,832,254 A  * 11/1998  Brewer ....................... 395/553
5,845,060 A  * 12/1998  Vrba et al. ................. 395/182.1
6,023,771 A  *  2/2000  Watanabe .................... 713/501

FOREIGN PATENT DOCUMENTS

| DE | 36 25 318 | 6/1990 |
| DE | 38 32 800 | 1/1991 |
| DE | 44 01 468 | 9/1994 |
| EP | 0 742 498 | 11/1996 |
| EP | 0 742 499 | 11/1996 |

* cited by examiner

*Primary Examiner*—Thomas Lee
*Assistant Examiner*—Suresh K Suryawanshi
(74) *Attorney, Agent, or Firm*—Kenyon & Kenyon

(57) ABSTRACT

A system is described for reliable monitoring of clock rates, where a first processor which receives a first clock rate causes a counter to count using this first clock rate. A second processor which receives a second clock rate also causes another counter to count using the second clock rate. The readings of the counters are stored by the processors at predefined intervals in a common memory. Subsequently each of the processors loads the counter reading of the other processor, and compares it with its own counter reading. If both readings are within a tolerance range, one of the counter readings is used as a reference for all the other counters and the other counter readings are made equal to this reference value, so that subsequent monitoring of the processors is based on this reference value for the respective counters. If a reading is outside the tolerance range, an error is triggered.

11 Claims, 1 Drawing Sheet

METHOD AND CIRCUIT ARRANGEMENT FOR USING TWO PROCESSORS TO READ VALUES OF TWO INDEPENDENTLY CLOCKED COUNTERS, EXCHANGING VALUES THEREBETWEEN, COMPARING TWO VALUES TO DETERMINE ERROR WHEN THE COMPARISON EXCEED A THRESHOLD

The invention relates to a method and system for reliable monitoring of clock rates in a redundant system with at least two clock signals. In particular, the method and system use existing components and tolerate slight deviations in clock rates.

DESCRIPTION OF RELATED ART

German Patent 38 32 800 C2 describes an arrangement for reliable monitoring, by means of signal technology, of a dual-channel reliable computer against missing or drifting clock signals in one direction. In each computer channel the inverted clock signals are monitored for antivalence by a dual-channel control element. As soon as it has been determined that the clock signals for the dual-channel computer are no longer antivalent, a switch is triggered that interrupts at least the supply voltage for the computer's output port. For this purpose, a special relay arrangement is provided, which ensures that the switch is only closed for the supply voltage of the computer channels when the clock signals are error-free.

The described arrangement has the disadvantage that the relay circuit needed for implementing it is complex and therefore expensive, and requires a considerable amount of space. Another disadvantage is that in the event of a phase shift between the clock signals by 180 degrees only, there is no more antivalence of the clock signals, so that the output ports are switched off. Such a small drift of the clock signal sources can usually only be prevented using a disproportionate amount of technical resources, especially in the case of extended operation. In addition, such a small drift of the clock signal sources is insignificant for the proper operation of the dual-channel computer, so that shutoff would not be necessary for such a small deviation over a long operating period.

German Patent 36 25 318 C2 describes an arrangement for reliable monitoring of two clock signals using signal technology, in which the clock signals are offset in time with respect to each other, and they each trigger a monoflop assigned to them. The output signals of the monoflops are sent to a reliable antivalence comparator using signal technology, and the output signal of the comparator is in turn monitored by a reliable RS memory using signal technology. The output signal of the RS memory controls a switch element that can turn off the power or signal flow.

In this case too there is the disadvantage that even a phase difference of 180 degrees in the two monitored clock signals causes the power flow or the signal flow to be turned off. Such a small deviation in the two clock signals, especially over a relatively long period of operation, can only be prevented with a large effort, and usually only results in a small delay, but not in an error that would justify a shutoff.

European Patent Application 742 498 A2 describes a method for taking into consideration a single-channel program code in a dual-channel reliability-oriented system structure. The single-channel program code is called in one channel of the dual-channel reliability-oriented system structure, and at the same time a monitoring function is started in both channels. Both monitoring functions include a cross-comparison of data or results, where the result or the regular running of the single-channel program code is checked in both channels, independently of one another, by reading the process status in each. If it is then established that the process states in the two channels differ, an error response is triggered. This method has the disadvantage that only the regular running of programs can be monitored. No clock signal monitoring is provided.

European Patent Application 742 499 A2 describes a method for reliable processing of reliability-oriented process signals. For this purpose, the process signals to be monitored are sent independently to at least two computers that are also independent of one another, forming two monitoring channels. Then the process signals are subjected to input processing in which the computers perform a cross-comparison of results and data. The output signals resulting from the input signal processing are interpreted in the monitoring channels, and results and data are cross-compared. The process-status-dependent signals are then generated. Finally, these signals are subjected to output signal processing, in which the results and data are cross-compared again. The signals thus obtained are used for redundant triggering of reliability-relevant process parameters. This method has the disadvantage that, while it is well-suited for monitoring parameters generated in a process, it does not allow a clock signal to be monitored.

It is known from DIN V VDE 0801/01.90, "Grundsatze fur Rechner in Systemen mit Sicherheitsaufgaben" [Principles for computers in systems performing reliability functions], Attachment point B.2.1.6.2, that in a reliable system the clock must also be monitored. For this purpose, the publication proposes that a "watchdog" circuit having a separate time base be used, or, in a multichannel system, mutual monitoring be performed. It is not disclosed in this publication which method and which circuit are used to perform mutual monitoring.

SUMMARY OF THE INVENTION

The present invention is thus a method and a circuit arrangement to perform the method, whereby reliable monitoring of the clock rates of at least two clock signals is possible. Existing modules should preferably be used to form the circuit arrangement. Furthermore, slight deviations of the clock rates, which do not result in malfunction, must be tolerated by the system.

Accordingly, the invention is a method for reliable monitoring of clock rates in a redundant multichannel system having independent clock signal generators for generating clock signals that are compared to one another, including the steps of supplying the clock signals from at least two channels to corresponding independent counters, counting the clock signals in the independent counters using the clock rates, and reading the independent counters with at least two processors operating substantially synchronously over time. The method also includes exchanging the counter readings between the at least two processors via an interface, comparing in one processor at least one counter reading exchanged via the interface with a local counter reading of the processor, and performing an error handling procedure if a result of the comparison exceeds a pre-selected tolerance in one of a difference and a quotient computed between the at least one exchanged counter reading and the local counter reading.

In a different embodiment, the invention is a circuit arrangement for reliable monitoring of clock rates in a redundant multichannel system having independent clock signal generators for generating clock signals in each channel of the system, where each channel includes a processor for receiving the clock signal from the corresponding independent clock signal generator, a counter bidirectionally connected to the processor, and an interface bidirectionally connected to the processor and to additional processors of other channels.

The invention is based on the theory that an excessive number of error shutdowns of a dual-channel system occur in practice due to differing clock rates. In particular, during long periods of operation over several days, even slight phase differences between the independent clock generator units may add up and cause an error shutdown due to different clock rates. This is, however, undesirable, since such a slight difference between the two clock generator units only results in a slight delay in the range of a few clock periods, but usually does not result in unreliable operation.

According to the present invention, to determine that the two clock rates are identical, a first processor causes a counter to count with a first clock signal supplied to this processor. Using the second clock signal supplied to it, the second processor also causes a counter to count. The readings of the counters are stored in defined time intervals by the at least two processors in a memory that is common to all processors. Subsequently, each processor loads the reading of the other processors and compares it with its own reading. If it is established that the two readings are within a tolerance range, one of the counter readings is used as a reference for all other counters, and the other readings are adjusted to become equal to this reference reading. Further monitoring of the processors will then be based on this reference value for the respective counter. If a counter reading is outside the tolerance range, an error is triggered on both channels.

According to the invention, a distinction can be advantageously made between a slight deviation between the clock generator units which can be tolerated, and a difference in the clock rates that endangers the reliability of the operation. Furthermore, a slight deviation in the clock rates is compensated for, so that the deviations cannot add up and become larger over the duration of the operation. Thus the deviation between the clock generator units can be qualitatively evaluated.

BRIEF DESCRIPTION OF THE DRAWINGS

Details and further advantages of the invention are described below with reference to the embodiment illustrated in the drawings. In the drawings.

DETAILED DESCRIPTION OF THE INVENTION

The following text describes an application of the invention to a reliable numerical Control for a machine tool, which has a dual-channel reliable structure. The clock rates are to be reliably monitored in this example.

Figure 1A:
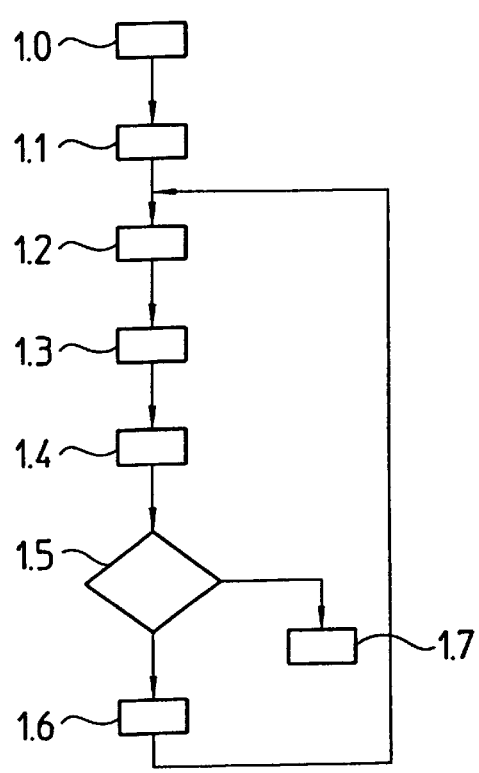
FIG. 1a shows a schematic of a sequence of the method occurring in a first channel, according to one embodiment of the present invention.
Figure 2:
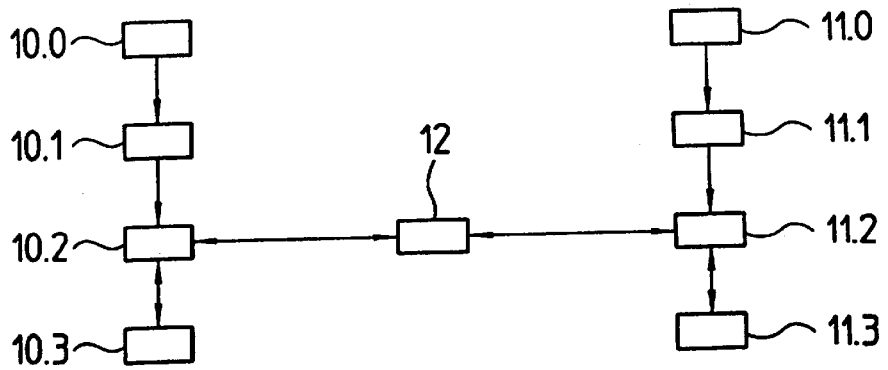
FIG. 2 shows a schematic of an embodiment of the circuit arrangement according to the present invention.

According to FIG. 1a, a clock signal is initially generated in step 1.0 in a first channel of the controller which can have, for example, an MCU processor 10.2, as shown in FIG 2. In step 1.1 this clock signal is stepped down in one or more stages by a suitably set divider 10.1 into a clock rate with which a counter 10.3 is to count. Step 1.1 is optional, and can also be provided at other points of the sequence, additionally or as an alternative to this sequence. In step 1.2 the clock signal generated in step 1.1 changes the reading of a counter 10.3 by one. A difference can still be calculated even in the event of a counter overrun due to the use of a modulo counting method. In step 1.3 the most recent counter reading is stored in a memory 12 that is common to the two channels.

Figure 1B:
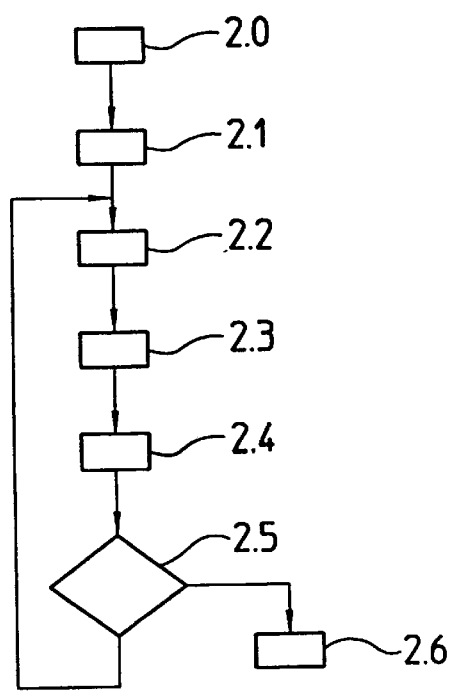
FIG. 1b shows a schematic of a sequence according to the embodiment shown in FIG. 1a, occurring in a second channel.

As FIG. 1b shows, in a first step 2.0 a clock signal is also generated in the second channel of the controller, which has a CCU processor 11.2, shown in FIG. 2. This clock signal is fully independent of the clock signal of the first channel generated in step 1.0. Subsequently, in step 2.1, the clock rate of the clock signal generated is stepped down in one or more stages. Step 2.1 is also optional, and can also be provided at other points of the sequence in addition or as an alternative to the sequence shown. In step 2.2, a counter 11.3 is caused to count with the clock rate set in step 2.1 as in the first channel. The most recent counter reading is stored during step 2.3 in a memory 12 that is common to both channels, at memory locations that are different for each channel.

As an alternative to immediate storage of the counter readings from the first and second channel in common memory 12, in order to alleviate the load on processors 10.2 and 11.2, the counter readings from the first and second channel may be stored in memory 12 only at certain time intervals. For this purpose, the memory storage process is time-triggered in the two processors 10.2 and 11.2. The time basis needed therefor can be generated separately in the two processors 10.2 and 11.2 or in only one of the two processors 10.2 or 11.2, either in an integrated manner for both processors, or externally via a timer unit. This ensures that the counter readings of the clock rates of both processors 10.2 and 11.2 are stored substantially at the same time.

Subsequently, as shown in FIGS. 1a and 2, processor 10.2 loads the counter reading of processor 11.2 of the other channel from the common memory 12, in the first controller channel in step 1.4, and compares it with its own counter reading in step 1.5.

The absolute deviation is divided by the value read to obtain a percentage deviation. If the percentage deviation thus obtained is within a preselected tolerance range, there is no error. If the tolerance is exceeded, however, an error handling procedure is triggered.

If the difference between the two counter readings exceeds the preselected tolerance, an error handling procedure is triggered by processor 10.2. Otherwise the entered reading of the second channel is accepted as the counter reading also for the first channel in step 1.6. Thus it is ensured that small deviations, even over a longer period of time, do not result in error handling procedures.

FIG. 1b shows the procedure performed in the second channel, which is substantially identical to the procedure performed in the first channel. In step 2.4 the counter reading of processor 10.2 of the first channel is read from common memory 12, and in step 2.5 this reading is compared to the counter reading of the second channel. In the second channel is also checked whether the percentage deviation of the counter readings is within a certain preselected tolerance. If the tolerance is respected, identical clock rates are recognized in the two channels, indicating a reliable operating state. If, however, it is found that the difference of the two clock rates of the first and second channels is not within the tolerance, an error handling procedure is triggered by processor 11.2 in step 2.6.

When an error handling procedure is triggered, an error message is output for the user indicating the deviation of the clock rates that has occurred, and the units that deliver erroneous output signals due to the error are shut off. In a numerically controlled machine tool, for example, all the drives are stopped.

As an alternative, step 1.6 can also be carried out in the second channel, so that counter 11.3 accepts the counter reading of the first channel in the second channel.

In another embodiment, the clock rates in the first and second channels can also be required to be multiples of one another. In that case, the change in the quotient of the two clock rates in the first and second channel is monitored, and must be within a certain tolerance over time for error-free operation. For this purpose, at least the last calculated quotient of the two clock rates is stored in common memory 12 and is compared with the next calculated quotient. The variation thus obtained may not exceed a preselected threshold value. This makes it possible to compare different clock rates in the first and second channels. No special divider needs to be provided in order to bring the clock rates in the first and second channels to the same value.

If a malfunction occurs, so that the clock rates of a first channel differ considerably from those of a second channel, this malfunction is detected in step 1.5 by a first processor or in step 2.5 by a second processor. If one of the two clock signals disappears completely, the processor to which the clock signal is supplied also stops operating.

Then the error is recognized by the processor whose clock signal did not disappear, and an error handling procedure is executed in step 1.7 or 2.6.

In another possible embodiment, the dual-channel monitoring of the clock rates is automatically activated by at least one of the two processors 10.2 or 11.2 in the case of particularly time-critical control tasks being performed. The processor recognizes the need for monitoring the clock rates from commands in the program code to be executed, which is evaluated for this purpose, or by direct user input. As monitoring begins, the counter reading of one channel is initially accepted by the other channel, so that the initial values of the counters in both channels are the same.

In another alternative embodiment, the counter reading is corrected in one of the two channels within the allowable tolerance and as a function of the deviation of the other counter reading that has been determined. Thus only intolerably high deviations in the counter readings are allowed to add up. In this manner, the tolerance range can be reduced or the identity of the two counter values can be monitored.

FIG. 2 shows a possible circuit arrangement according to the present invention. In a first channel, a clock generator 10.0 for generating a clock signal with a required clock rate is connected to divider 10.1. Divider 10.1 is optional in the design. Other dividers can be provided at almost all points of the circuit arrangement, in order to generate the required clock rate. The output signal of divider 10.1 and of any other dividers is sent to a processor 10.2, which is operated with that clock rate.

Processor 10.2 has various functions in the numerical control in question, so that it is only partly used for monitoring the clock rates. Processor 10.2 has a bidirectional link to a counter 10.3, through which the clock signal of processor 10.2 is forwarded to the counter, and through which the counter readings can also be bidirectionally transmitted. This counter 10.3 counts using the clock rate received from processor 10.2. Furthermore, processor 10.2 is connected to a memory 12.

In a second channel having substantially the same structure, a clock generator 11.0 for generating a clock signal having a required clock rate is connected to a divider 11.1. Divider 11.1 is also optional, and other dividers can be provided at almost any point of the circuit arrangement in order to generate the required clock rate. The output signal of divider 11.1 and any other dividers is supplied to a processor 11.2, which is operated at the clock rate of the output signal. Processor 11.2 also has, in the numerical control in question, various functions, so that it is only partly used for monitoring the clock rates. Processor 11.2 has a bidirectional link to a counter 11.3, through which the clock signal of processor 11.2 is forwarded to the counter, and through which the counter readings can also be bidirectionally transmitted. This counter counts using the clock rate received from processor 11.2. Furthermore, processor 11.2, like processor 10.2, is connected to a memory 12.

In an alternative embodiment, counters 10.3 and 11.3 are implemented as subassemblies of the respective processors 10.2 and 11.2, respectively. This considerably simplifies and speeds up the data traffic between processors and counters.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for reliable monitoring of clock rates in a redundant multichannel system having independent clock signal generators for generating clock signals in each channel of the system, comprising the steps of:

supplying the clock signals from at least two channels to corresponding independent counters;

counting the clock signals in the independent counters using the clock rates;

reading the independent counters with at least two processors operating substantially synchronously over time;

exchanging the counter readings between the at least two processors via an interface;

comparing in one processor at least one counter reading exchanged via the interface with a local counter reading of the processor; and performing an error handling procedure if a result of the comparison exceeds a pre-selected tolerance, said comparison including one of a difference and a quotient computed between the at least one exchanged counter reading and the local counter reading.

2. The method according to claim 1, wherein the clock signals of the clock signal generators are stepped down by dividers.

3. The method according to claim 1 or 2, further comprising the preliminary steps of activating the monitoring via one of a user control and automatic signal from one of the at least two processors; and loading in all the independent counters a reference reading from one of the independent counters.

4. The method according to claim 3, further comprising the step of synchronizing the counter readings by time triggering of the at least two processors.

5. The method according to claim 1, further comprising the step of correcting the counter readings if the result of the comparison does not exceed the pre-selected tolerance but exceeds a pre-selected threshold.

6. The method according to claim 1, further comprising the step of using the redundant multichannel system to operate a numerically controlled device.

7. A circuit arrangement for reliable monitoring of clock rates in a redundant multichannel system having independent clock signal generators for generating clock signals in each channel of the system, each channel comprising:

a processor for receiving the clock signal from the corresponding independent clock signal generator;

a counter bidirectionally connected to the processor; and an interface bidirectionally connected to the processor and to additional processors of other channels.

8. The circuit arrangement according to claim 7, wherein the interface comprises a common memory.

9. The circuit arrangement according to claim 7, wherein the interface comprises a direct connection via optical fibers between the processor and the additional processors.

10. The circuit arrangement according to claim 7, wherein the counter is integrated in the respective processor.

11. The circuit arrangement according to claim 7, wherein the counter is implemented via software modules in the respective processor.

* * * * *